United States Patent

Menzel et al.

[11] Patent Number: 5,225,116
[45] Date of Patent: Jul. 6, 1993

[54] CONTACT BODY FOR COOLING TOWERS

[75] Inventors: Knut Menzel, Essen; Hartwig Basse, Nordenham, both of Fed. Rep. of Germany

[73] Assignee: Balcke-Dürr Aktiengesellschaft, Ratingen, Fed. Rep. of Germany

[21] Appl. No.: 866,784

[22] Filed: Apr. 9, 1992

[30] Foreign Application Priority Data

Apr. 9, 1991 [DE] Fed. Rep. of Germany ....... 4111451

[51] Int. Cl.$^5$ ............................................. B01F 3/04
[52] U.S. Cl. ............................... 261/94; 261/DIG. 72
[58] Field of Search .......................... 261/94, DIG. 72

[56] References Cited

U.S. PATENT DOCUMENTS

| | | | |
|---|---|---|---|
| 96,842 | 11/1869 | Shaler | 261/94 |
| 2,615,699 | 10/1952 | Dixon. | |
| 3,010,706 | 11/1961 | McWilliams | 261/94 |
| 3,262,682 | 7/1966 | Bredberg | 261/112.2 |
| 3,346,246 | 10/1967 | Loetel et al. | 261/112. 2 |
| 3,425,810 | 2/1969 | Scott, Jr. | 261/94 |
| 3,704,869 | 12/1972 | Priestley | 261/112.2 |
| 4,014,962 | 3/1977 | Notario | 261/DIG. 72 |
| 4,411,942 | 10/1983 | Nickel et al. | 261/94 |
| 4,562,015 | 12/1985 | Lefevre | 261/94 |
| 4,985,182 | 1/1991 | Basse et al. | 261/94 |

FOREIGN PATENT DOCUMENTS

| | | | |
|---|---|---|---|
| 0011176 | 10/1979 | European Pat. Off. . | |
| 0069241 | 1/1983 | European Pat. Off. | 261/DIG. 72 |
| 2312649 | 3/1973 | Fed. Rep. of Germany . | |
| 1340526 | 11/1962 | France . | |
| 84609 | 2/1963 | France . | |
| 87683 | 4/1965 | France . | |
| 676140 | 8/1966 | France | 210/150 |
| 0151354 | 10/1981 | German Democratic Rep. | 261/DIG. 72 |
| 1015198 | 1/1989 | Japan | 210/150 |
| 1363416 | 8/1974 | United Kingdom | 261/DIG. 72 |
| 1439745 | 6/1976 | United Kingdom | 261/DIG. 72 |

*Primary Examiner*—Tim Miles
*Attorney, Agent, or Firm*—Robert W. Becker & Associates

[57] ABSTRACT

A contact body for a cooling tower in which water to be cooled is distributed from the top of the contact body and in which cooling air flows through the contact body in a cross current and/or counter current flow relative to the water flow, is comprised of a plurality of tubular lattice-type plastic bodies that are assembled to form a packaged element such that respective outer mantle surfaces of the tubular plastic bodies contact one another. The tubular plastic bodies are cut to length from a continuously manufactured endless tube that is formed of crossing stays. The cut length of the tubular plastic bodies corresponds to a selected dimension of the contact body, i.e., the height or width of the contact body. The ends of the tubular plastic bodies on at least one side of the packaged element are connected to one another, preferably by fusing.

11 Claims, 3 Drawing Sheets

CONTACT BODY FOR COOLING TOWERS

BACKGROUND OF THE INVENTION

The present invention relates to a contact body for cooling towers comprising a plurality of lattice-type members made of plastic which are connected to one another to form a packaged element and whereby the water to be cooled is distributed from the top and the cooling air flows through the contact body in a crosscurrent and/or countercurrent flow relative to the water flow.

Such contact bodies for cooling towers are known in various embodiments. They are comprised of individual planar and/or corrugated lattice panels. Such lattice panels are manufactured in the form of individual panels by an injection molding process. Due to this discontinuous manufacturing process, these panels are very expensive. Furthermore, they require a complicated mounting process in which additional fastening elements are necessary.

It is therefore an object of the present invention to provide a contact body for cooling towers of the aforementioned kind, the manufacture and mounting of which is substantially facilitated and cheaper without impairing the thermal-hydraulic effectiveness of the contact element.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
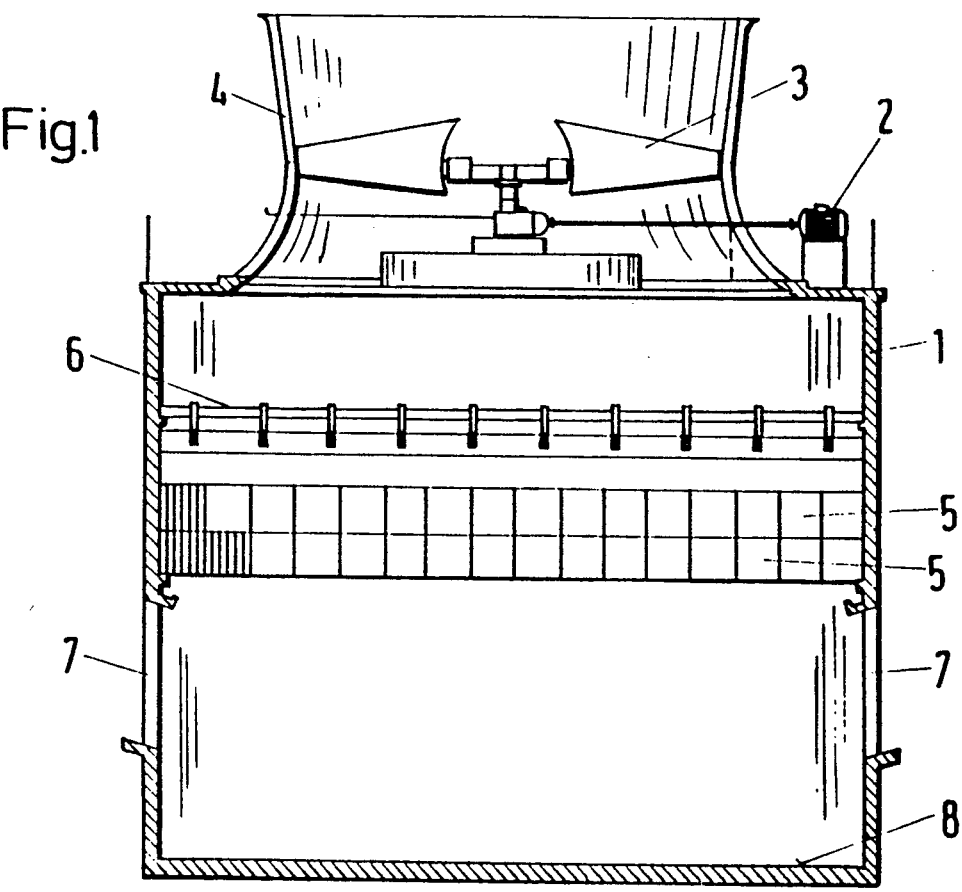
FIG. 1 is a vertical cross-section of a forced-ventilated cooling tower in which the cooling air is supplied in countercurrent flow relative to the water flow.

The contact body of the present invention is primarily characterized in being comprised of a plurality of tubular lattice-type plastic bodies that are assembled to form said contact body as a packaged element such that respective outer mantle surfaces of the tubular plastic bodies contact one another, the tubular plastic bodies being cut to length from a continuously manufactured endless tube and being formed of crossing stays, the length of the tubular plastic body corresponding to a selected dimension of the contact body, and with ends of the tubular plastic bodies on at least one side of the packaged element being connected to one another.

The inventive contact body has the advantage that the individual tubular lattice-type plastic bodies may be manufactured in a continuous process, for example, in an extrusion or pulltrusion process, in an inexpensive manner and may be connected in a simple manner at their ends, for example, by fusing to form a packaged element. In addition to a cheaper manufacture, the mounting of the inventive contact body is also less expensive compared to known contact bodies.

It is preferable that the tubular plastic bodies are arranged parallel to one another. In an advantageous embodiment, the tubular plastic bodies are arranged in parallel to form respective individual rows within the packaged element of the contact body, whereby these rows are arranged such that the tubular plastic bodies in adjacent rows are crossing one another. It is furthermore advantageous to provide at least one panel arranged between two adjacent ones of the rows for reinforcing the packaged element. Preferably, this panel is a lattice-type panel. In a further embodiment, the ends of the tubular bodies are connected to one another by fusing, resulting in a reinforced structure of fused plastic material, and further comprising a lattice-type panel connected to the ends which are connected by fusing.

With this preferred embodiment, the edge stability as well as the overall stability of the contact body is increased in a simple manner, especially with respect to servicing and mounting such contact bodies within the cooling towers requiring that service personnel are able to walk on these contact bodies.

According to the present invention, the tubular plastic bodies may have a circular, oval, or polygonal cross-section, including square or rectangular shapes. Furthermore, it is possible according to the present invention to provide the tubular plastic bodies with radially inwardly extending ribs that extend in the longitudinal direction of the tubular bodies, i.e. over their entire length. These ribs increase the exchange surface between the water to be cooled and the cooling air and also increase the stability of the tubular lattice-type plastic body.

In a preferred embodiment of the present invention a first portion of the stays extends in a longitudinal direction of the tubular plastic bodies, and is shaped in the form of a helix. These (longitudinal) stays thus guide the water to be cooled in a direction which deviates from the vertical direction so that the heat exchange capacity of the inventive contact body is increased. A further increase of the heat exchange capacity may be achieved by providing a second portion of the stays which extend in a slanted fashion transverse to the first portion of the stays. In other words, the transversely extending stays (transverse stays) are slanted between individual crossing points of the longitudinal stays and the transverse stays. Accordingly, a continuous division and recombination of the individual water flow paths along the tubular plastic bodies is accomplished resulting in a very high thermal-hydraulic degree of efficiency. A further improvement provides that the stays of the second portion (transverse stays) on opposite sides of a respective one of the stays of the first portion (longitudinal stays) are staggered relative to one another. It is also possible that a first portion of the stays extends parallel to a longitudinal direction of the tubular plastic bodies and a second portion of the stays extends at a right angle relative to the stays of the first portion.

DESCRIPTION OF PREFERRED EMBODIMENTS

The present invention will now be described in detail with the aid of several specific embodiments utilizing FIGS. 1 through 6.

Figure 2:
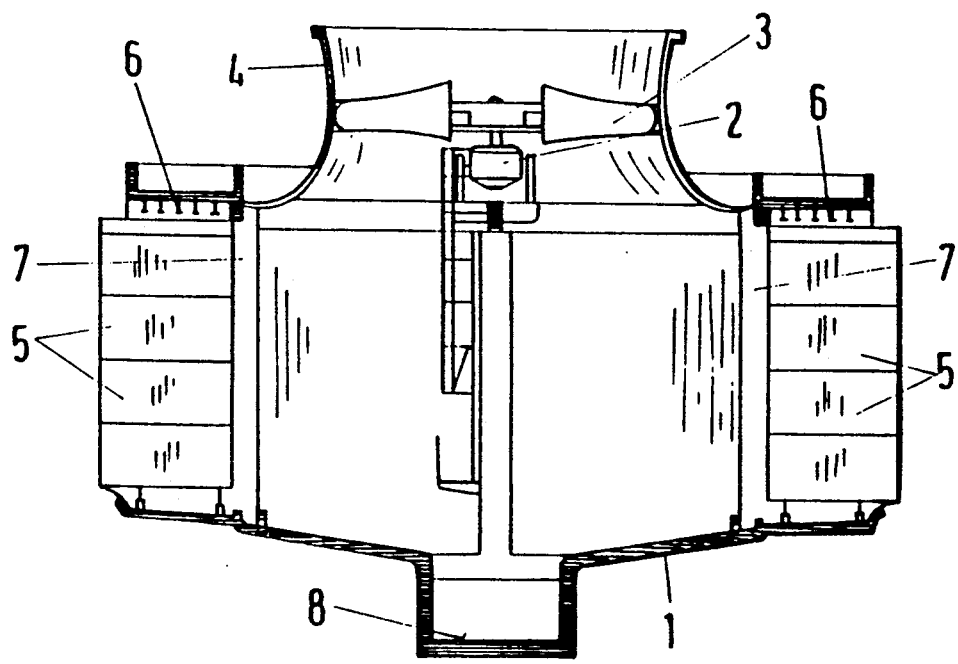
FIG. 2 is a vertical cross-section through a forced ventilated cooling tower in which the cooling air is provided in a crosscurrent flow relative to the water flow.

The cooling towers, schematically represented in FIGS. 1 and 2, have a respective housing 1 and are further provided at their top with a blower 3 driven by a motor 2 which are both arranged in a hyperbolic blower housing 4. In the interior of the housing 1, contact bodies 5 are arranged which are provided with water to be cooled from the top via a distributing device 6.

In the cooling tower represented in FIG. 1, the cooling air which is sucked in by the blower 3 is guided through the contact bodies 5 in a countercurrent flow with respect to the water to be cooled. The contact bodies 5, for this purpose, are arranged in a horizontal arrangement over the entire cross-section of the housing 1. The cooling air enters the housing 1 via lateral cooling air vents 7 end flows through the contact bodies 5 from the bottom to the top. At the bottom portion of the housing 1, a collecting device 8 for the cooled water is provided.

In the cooling tower represented in FIG. 2, the contact bodies 5 are provided in lateral cooling air vents 7 of the housing 1. Accordingly, the distributing device 6 for the water to be cooled is also arranged within the lateral sections of the housing 1. In this embodiment, the housing 1 is also provided with a central collecting device 8 for the cooled water. The cooling air is flowing in a crosscurrent flow with respect to the vertically downwardly flowing water.

Figure 3:
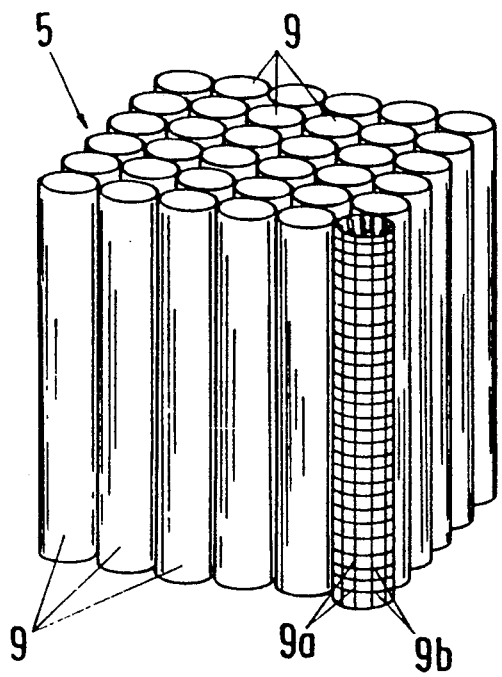
FIG. 3 is a perspective view of a portion of a contact body to be used in cooling towers according to FIGS. 1 and 2.

A specific embodiment for the contact bodies 5 to be used in cooling towers according to FIGS. 1 and 2 is shown in FIG. 3 in the form of a perspective representation of a portion of such a contact body 5. It can be taken from FIG. 3 that this contact body in the form of a packaged element is constructed from tubular lattice-type plastic bodies 9, one of the plastic bodies 9 being represented in a detailed view in FIG. 4. The plastic bodies 9 are cut to a length corresponding to one of the dimensions of the packaged element, i.e., the height, respectively, width from a continuously manufactured endless tube and are assembled to form the packaged element of the contact body, whereby the individual plastic bodies contact one another with their outer mantle surfaces. They are connected to one another at their ends, preferably by fusing, at least at one of the end faces of the resulting packaged element. Each individual plastic body 9 is comprised of crossing stays 9a and 9b.

Figure 4:
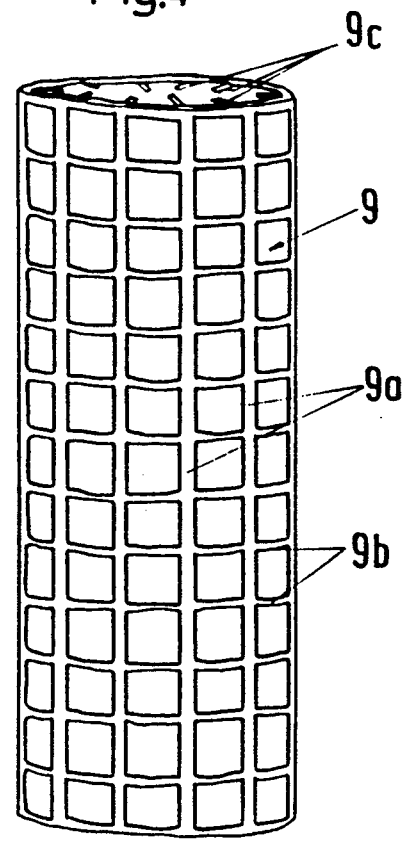
FIG. 4 is a detailed representation of a tubular lattice-type plastic body of the contact body represented in FIG. 3.
Figure 3A:
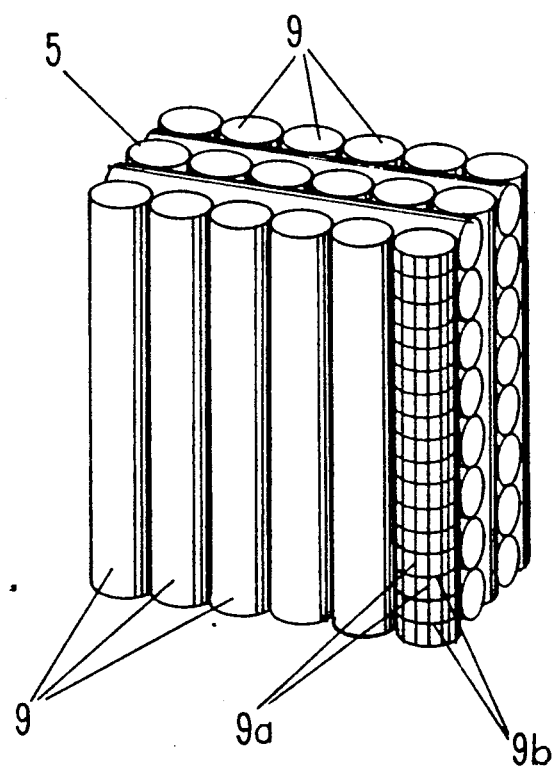
FIG. 3a is a perspective view of a crossed tube modification.
Figure 5A:
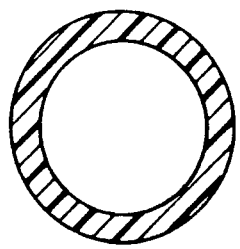
FIGS. 5a, 5b and 5c show modified cross sections.
Figure 5B:
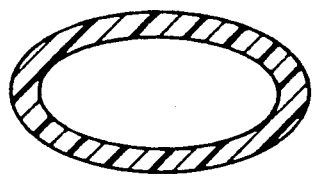
Figure 5C:
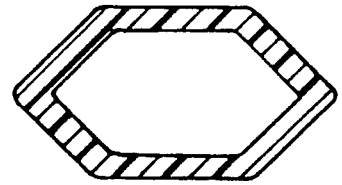

In the embodiment according to FIG. 4, the longitudinal stays 9a extend parallel to the center axis or longitudinal axis of the tube and the transverse stays 9b extend at a right angle thereto. The interior of the tubular plastic bodies 9 is provided with radially inwardly extending ribs 9c which extend in the longitudinal direction of the tubular plastic bodies over their entire length and serve to increase the surface area of the tubular plastic body 9.

Figure 6:
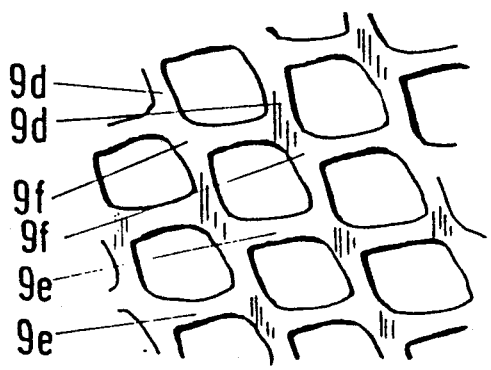
FIG. 6 is a detailed representation of the structure of the lattice-type plastic body according to FIG. 5.
Figure 5:
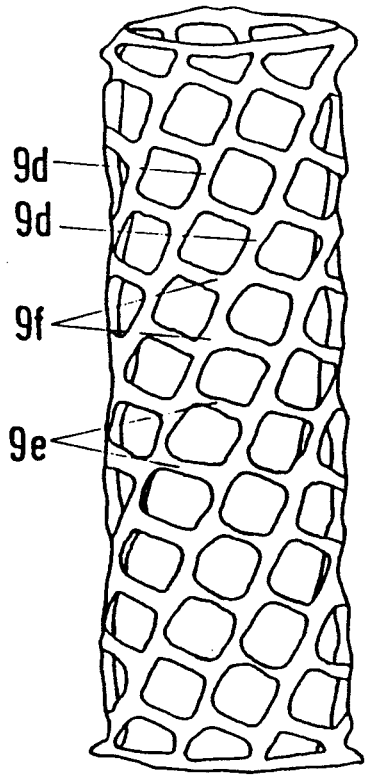
FIG. 5 shows a second embodiment according to the representation of FIG. 4 of a further tubular lattice-type plastic body.

In the embodiment according to FIGS. 5 and 6, the stays 9d extending essentially in the longitudinal direction of the tubular plastic body 9 are shaped in the form of helix. The transverse stays 9e which extend essentially at a right angle to the stays 9d are arranged such that they are not continuous, but, in the area of the crossing points 9f, are staggered relative to one another on opposite sides of the longitudinal stays 9d. Due to this arrangement, the water flowing in a downward direction along the helically wound longitudinal stays 9d of the lattice-type plastic body 9 are divided in the area of each crossing point 9f so that a continuous division of the water flow results which, in return, increases the heat exchange with the cooling air.

Since the tubular lattice-type plastic body 9, which is formed of crossing longitudinal and transverse stays 9a, 9b, respectively, 9d, 9e, may be cut from a continuously manufactured tube, a continuous and thus inexpensive manufacture is provided. The individual tubular lattice-type plastic bodies 9, which are preferably cut to a height, respectively, width of the contact bodies 5, are then assembled to form the contact body 5 as a packaged element whereby the individual plastic bodies 9 contact on another with their outer mantle surfaces and are then connected at their ends, preferably by fusing the plastic material from which the plastic bodies 9 are manufactured, at least at one end face of the resulting packaged element. The tubular lattice-type plastic body 9 may have a circular, oval, polygonal (including square or rectangular) tube cross-section. They may be assembled such that they are aligned parallel to one another or in an arrangement in which the plastic bodies 9 in individual rows are parallel to one another and are arranged such that tubular plastic bodies in adjacent rows are crossing one another.

In order to reinforce the resulting packaged element (contact body), panels may be arranged between two adjacent ones of the aforementioned rows. As an alternative or as an additional measure, it is also possible to provide at least the end face of the packaged element in addition to the reinforcement structure of fused plastic material with a further lattice-type panel so that especially the stability of the contact body 5 with respect to servicing personnel walking on the contact bodies 5 is improved. The aforementioned panels are preferably also manufactured as lattice-type plastic panels.

The present invention is, of course, in no way restricted to the specific disclosure of the specification and drawings, but also encompasses any modifications within the scope of the appended claims.

What we claim is:

1. A contact body for a cooling toward wherein water to be cooled is distributed from the top of said contact body in a downward direction and cooling air flows through said contact body in a crosscurrent and-/or counter-current flow relative to the water flow, said contact body being comprised of:

a plurality of tubular lattice-type plastic bodies that are assembled to form said contact body as a packaged element such that respective outer mantle surfaces of said tubular plastic bodies contact one another, said tubular plastic bodies being cut to length from a continuously manufactured endless tube and being formed of crossing stays, said length of said tubular plastic bodies corresponding to a selected dimension of said contact body, with ends of said tubular plastic bodies on at least one side of said packaged element being connected to one another, with a first portion to said stays extending in a longitudinal direction of said tubular plastic bodies and a second portion of said stays extending in a slanted fashion transverse to said stays of said first portion and intersecting said stays of said first portion in a common plane at points of intersection, and wherein said stays of said second portion on opposite sides of a respective one of said stays of said first portion are staggered relative to one another.

2. A contact body according to claim 1, wherein said tubular plastic bodies are arranged parallel to one another.

3. A contact body according to claim 1, wherein said ends of said tubular bodies are connected to one another by fusing, resulting in a reinforcement structure of fused plastic material, and further comprising a lattice-type panel connected to said ends that are connected by fusing.

4. A contact body according to claim 1, wherein said tubular plastic bodies have a circular cross-section.

5. A contact body according to claim 1, wherein said tubular plastic bodies have an oval cross-section.

6. A contact body according to claim 1, wherein said tubular plastic bodies have a polygonal cross-section.

7. A contact body according to claim 1, wherein said tubular plastic bodies further comprise radially inwardly extending ribs extending in a longitudinal direction of said tubular plastic bodies.

8. A contact body according to claim 1, wherein said first portion of said stays is shaped in the form of a helix.

9. A contact body according to claim 1, wherein said tubular plastic bodies are arranged in parallel to form respective individual rows within said packaged element, said rows being arranged such that said tubular plastic bodies in adjacent ones of said rows are crossing one another.

10. A contact body according to claim 9, further comprising at least one panel arranged between two adjacent ones of said rows for reinforcing said packaged element.

11. A contact body according to claim 10, wherein said panel is a lattice-type panel.

* * * * *